(12) United States Patent
Lang et al.

(10) Patent No.: US 9,007,390 B2
(45) Date of Patent: Apr. 14, 2015

(54) CREATION AND MANIPULATION OF HAND DRAWN OBJECTS WITH AUTOMATIC GROUPING

(71) Applicant: Evernote Corporation, Redwood City, CA (US)

(72) Inventors: Keith Lang, Austin, TX (US); Johnathan Hebert, Austin, TX (US)

(73) Assignee: Evernote Corporation, Redwood City, CA (US)

( * ) Notice: Subject to any disclaimer, the term of this patent is extended or adjusted under 35 U.S.C. 154(b) by 187 days.

(21) Appl. No.: 13/775,385

(22) Filed: Feb. 25, 2013

(65) Prior Publication Data

US 2013/0307861 A1    Nov. 21, 2013

Related U.S. Application Data

(60) Provisional application No. 61/647,125, filed on May 15, 2012.

(51) Int. Cl.
    *G06F 3/048*    (2013.01)
    *G06F 3/0488*   (2013.01)
    *G06F 17/24*    (2006.01)

(52) U.S. Cl.
    CPC ...... *G06F 3/048* (2013.01); *G06F 2203/04808* (2013.01); *G06F 3/04883* (2013.01); *G06F 17/242* (2013.01)

(58) Field of Classification Search
    CPC ....... G06T 19/00; G06T 11/20; G06T 11/203; G06F 3/0484; G06F 8/38; G06F 3/041; G06F 3/0386; G06F 3/04883; G06F 3/03545; G06F 3/03547; G05B 2219/23258; G06K 9/222
    See application file for complete search history.

(56) References Cited

U.S. PATENT DOCUMENTS

| | | | |
|---|---|---|---|
| 5,646,650 A | 7/1997 | Miller et al. | |
| 7,093,202 B2 | 8/2006 | Saund et al. | |
| 7,382,921 B2 | 6/2008 | Lossev et al. | |
| 7,409,089 B2 | 8/2008 | Simmons et al. | |
| 7,437,003 B1 | 10/2008 | Gorbatov et al. | |
| 7,450,763 B2 | 11/2008 | Gorbatov et al. | |
| 7,603,142 B1 | 10/2009 | Toebes et al. | |
| 7,714,866 B2 * | 5/2010 | Sander | 345/441 |
| 7,880,744 B2 | 2/2011 | Bruderlin et al. | |
| 7,969,440 B1 | 6/2011 | Polyakov et al. | |
| 8,014,630 B1 | 9/2011 | Polyakov et al. | |
| 8,116,569 B2 | 2/2012 | Markiewicz et al. | |
| 8,130,226 B2 | 3/2012 | Brunner et al. | |
| 8,189,922 B2 * | 5/2012 | Zawacki et al. | 382/188 |
| 8,749,572 B2 * | 6/2014 | DiVerdi et al. | 345/592 |
| 2004/0174361 A1 | 9/2004 | Yomdin et al. | |
| 2010/0251111 A1 | 9/2010 | Ozaki et al. | |
| 2012/0033876 A1 | 2/2012 | Momeyer et al. | |

* cited by examiner

*Primary Examiner* — Antonio A Caschera
(74) *Attorney, Agent, or Firm* — Muirhead and Saturnell, LLC

(57) ABSTRACT

A graphical drawing includes maintaining recently drawn strokes in a wet state after the strokes are drawn, causing strokes in a wet state to transition to a dry state based on passage of time, proximity of other recently drawn strokes, and/or explicit user input directing that at least some wet strokes be transitioned to the dry state, and grouping strokes in the dry state for future user manipulation based at least in part on how the strokes transitioned from the wet state to the dry state. Wet ink strokes may transition from the wet state to the dry state in response to not adding any new wet ink strokes for a predetermined amount of time. The predetermined amount of time may be twelve hundred milliseconds.

22 Claims, 9 Drawing Sheets

CREATION AND MANIPULATION OF HAND DRAWN OBJECTS WITH AUTOMATIC GROUPING

RELATED APPLICATIONS

This application claims priority to U.S. Prov. App. No. 61/647,125, filed May 15, 2012, and entitled "METHOD AND PROCESS FOR CREATION AND MANIPULATION OF HAND DRAWN OBJECTS WITH AUTOMATIC GROUPING", which is incorporated by reference herein.

TECHNICAL FIELD

This application is directed to the field of data processing and presentation, and more particularly to the field of drawing and handwriting software for tablet computers.

BACKGROUND OF THE INVENTION

As of 2012, over a hundred million people have been using newly shipped tablets with multi-touch screens. Additionally, over half a billion smartphones possess multi-touch screens. All these devices enable and display on their screens user drawings and handwritten notes made with one or more fingers or employing special styluses. Note-taking and markup software application such as Evernote® Penultimate and Evernote® Skitch, both developed by the Evernote® Corporation of Redwood City, Calif., and many other software titles with digital ink entry, have become mass market products with millions of users. Accordingly, user interfaces (UIs) for stylus and pen based note-taking are gaining increasing attention by researchers, developers and public.

One apparent usability challenge faced by multi-touch and other pen-enabled UIs results from the fact that a stylus or a finger applied to a multi-touch screen or other writing-enabled surface is used for drawing and handwriting and is also used for object manipulation, navigation and editing. The necessity of coupling writing or drawing with manipulating and editing of previously entered objects, performed almost simultaneously and in a random order of the two types of activities, may cause conflicts and makes the design of intuitive UIs for extensive drawing, markup and handwritten note-taking a difficult task.

Software titles that support creation and editing of vector objects, such as editable digital ink, freehand shapes, or other instantly transformable objects may provide a special object manipulation mode where drawing and instant freehand transformations are prohibited; any multi-touch gestures or stylus movements over the screen in such object manipulation mode are interpreted as selection, editing and manipulations of vector objects and other items. When users need to enable writing and freehand shape editing, they press special tool buttons permanently present in the software toolbar. While such multi-mode design is conventional for high-end authoring tools and arguably resolves the conflict between drawing and object manipulations, such a design may overload product UIs and makes note-taking tools more complex and demanding (and respectively less intuitive and productive) for a broad user base.

Another challenge faced by user interfaces for multi-touch devices with writing and drawing capabilities is caused by an inefficient grouping of handwriting and drawing objects in the authoring software. A conventional grouping metaphor may be based purely on a line continuity so that any advanced grouping is deferred to the above-mentioned object manipulation mode.

Accordingly, it is desirable to provide simple user interface metaphors for multi-touch note-taking software products with a seamless combination between drawings/writing and on-screen object manipulations and with automatic enhanced object grouping.

SUMMARY OF THE INVENTION

According to the system described herein, providing a graphical drawing includes maintaining recently drawn strokes in a wet state after the strokes are drawn, causing strokes in a wet state to transition to a dry state based on passage of time, proximity of other recently drawn strokes, and/or explicit user input directing that at least some wet strokes be transitioned to the dry state, and grouping strokes in the dry state for future user manipulation based at least in part on how the strokes transitioned from the wet state to the dry state. Proximity of other recent drawing strokes may be determined by providing a bounding box that contains initial wet ink strokes and a dynamic outside rectangle outside the first bounding box and the initial wet ink strokes may transition from the wet state to the dry state in response to new wet ink strokes being provided outside the dynamic outside rectangle. A triggering distance between a side of the bounding box and a corresponding side of the dynamic outside rectangle may be ten percent of a diagonal size of a screen containing the graphical drawing. Wet ink strokes may transition from the wet state to the dry state in response to not adding any new wet ink strokes for a predetermined amount of time. The predetermined amount of time may be twelve hundred milliseconds. Wet ink strokes may transition from the wet state to the dry state in response to explicit user input. The explicit user input may include a user selecting a dry button on a screen containing the graphical drawing. Providing a graphical drawing may also include splitting a group of dry ink strokes of the graphical drawing into at least two separate portions, where each of the portions contains different strokes and manipulating at least one of the at least two of the portions without manipulating other ones of the portions. Providing a graphical drawing may also include regrouping the at least two separate portions based, at least in part, on a previous grouping of the at least two separate portions. Providing a graphical drawing may also include using a gesture to split the group of dry ink strokes. Providing a graphical drawing may also include causing strokes in the dry state to transition back to the wet state, where drawing operations do not effect ink in the wet state that was transitioned from the dry state. Presence of wet ink may inhibit selection and manipulation of any portions of the graphical drawing.

According further to the system described herein, computer software, provided in a non-transitory computer-readable medium, manipulates a graphical drawing. The software includes executable code that maintains recently drawn strokes in a wet state after the strokes are drawn, executable code that causes strokes in a wet state to transition to a dry state based on passage of time, proximity of other recently drawn strokes, and/or explicit user input directing that at least some wet strokes be transitioned to the dry state; and executable code that groups strokes in the dry state for future user manipulation based at least in part on how the strokes transitioned from the wet state to the dry state. Proximity of other recent drawing strokes may be determined by providing a bounding box that contains initial wet ink strokes and a dynamic outside rectangle outside the first bounding box and the initial wet ink strokes may transition from the wet state to the dry state in response to new wet ink strokes being provided outside the dynamic outside rectangle. A triggering distance between a side of the bounding box and a corresponding side of the dynamic outside rectangle may be ten percent of a diagonal size of a screen containing the graphical drawing. Wet ink strokes may transition from the wet state to the dry state in response to not adding any new wet ink strokes for a predetermined amount of time. The predetermined amount of time may be twelve hundred milliseconds. Wet ink strokes may transition from the wet state to the dry state in response to explicit user input. The explicit user input may include a user selecting a dry button on a screen containing the graphical drawing. The computer software may include executable code that splits a group of dry ink strokes of the graphical drawing into at least two separate portions, wherein each of the portions contains different strokes and executable code that facilitates manipulating at least one of the at least two of the portions without manipulating other ones of the portions. The computer software may also include executable code that regroups the at least two separate portions based, at least in part, on a previous grouping of the at least two separate portions. The executable code that splits a group of dry ink strokes may respond to a gesture to split the group of dry ink strokes. The computer software may also include executable code that causes strokes in the dry state to transition back to the wet state, wherein drawing operations do not effect ink in the wet state that was transitioned from the dry state. Presence of wet ink may inhibit selection and manipulation of any portions of the graphical drawing.

The set of contiguous fragments of drawings (strokes) entered by a user into a document may initially be presented as work in progress where individual strokes are not editable. Subsequently, the entered strokes may be automatically or semi-automatically grouped into subsets that may be manipulated and edited as a whole, may be split back into the original strokes and then manipulated or edited individually, or may be returned into a drawing mode as explained elsewhere herein.

In order to help users to distinguish between a work in progress and editable groups of strokes, a visual metaphor of wet and dry ink may be extended to handwritten documents. Visual appearance of strokes indicates the state of the strokes; for example, wet ink strokes, i.e. work in progress, may be displayed semi-transparent, glossy or textured, while dry, editable and grouped strokes may be shown opaque in the designated color of the strokes. Other screen effects, such as animated strokes, may also be applied to differentiate two different states of vector objects.

In one embodiment, an automatic grouping of strokes may be based on the time-and-space closeness of the strokes and may be performed as follows: The wet ink state persists for the newly entered strokes as long as the strokes are coming one after another separated by sufficiently short timeouts and are residing in a sufficient spatial proximity from each other on the device screen. Such wet strokes may not be not selectable or movable (i.e., may not be manipulated) so that any touch gesture, such as tapping or dragging using a finger on a multi-touch screen or a capacitive or other stylus is interpreted as drawing and adds a new dot or stroke, while the multi-finger gestures are either ignored or, on some systems with advanced multi-touch capabilities, such gestures (for example, a multi-finger swipe), when applied to wet ink, may be interpreted as multi-finger drawing. Once a newly entered stroke has been lagging a previously entered stroke longer than a default timeout or has been drawn further than a default distance from a bounding box of the current fragment of wet ink (the smallest coordinate rectangle containing all strokes from the fragment), the previously entered portion of wet ink (not including any new stroke) may be instantly grouped, made available for manipulations and redrawn as opaque strokes to indicate a dry ink state. An animated transition between the wet and the dry state, showing, for example, a decreasing transparency of strokes, may be displayed to give the user the look-and-feel of a drying ink process. In an embodiment, a default value of opacity for the wet ink may be set to 50%, the timeout for drying may be set to twelve hundred milliseconds, and the minimum distance between the dynamically updated bounding box of the wet ink and all points of the new stroke that causes drying and grouping may be set to ten percent of the diagonal screen size, measured by any coordinate x or y in the current screen resolution. In other words, if a new stroke completely belongs to a coordinate half-plane separated by either the x-coordinate or the y-coordinate from the bounding box of the existing fragment of the wet ink by more than ten percent of the diagonal screen size or has been started in more than twelve hundred ms from the end of the previous wet ink stroke, then all strokes in that bounding box are instantly grouped and dried, and the new stroke becomes the first stroke within a new fragment of the wet ink. Users may change default values of any parameters to adapt the UI to their visual and ergonomic requirements and/or a specific task.

Once a new stroke satisfies time-and-space drying requirements and is, therefore, disconnected from the previously drawn fragment of the wet ink, the previous fragment (containing one or more different strokes) may be instantly transformed into a single group and may be available for manipulations and editing. In an embodiment, clicking within such an automatically created group may instantly select all of the strokes of the group that can be subsequently operated upon, according to the general multi-touch user interface metaphor, including dragging, resizing, rotation, copy/cut/pasting, etc. using, for example, multi-finger multi-touch gestures, such as pinching for resizing or rotating with two fingers.

In another embodiment, a selection of a group of dry strokes may be accompanied by displaying a pop-up tool, a toolbar or a menu that may be used for manipulations and editing operations on par with multi-touch gestures or instead of such gestures.

An ungrouping operation, i.e. transforming a group of dry ink into its components, such as selectable and editable individual strokes, may also be performed in response to a designated multi-touch gesture, a button click or a menu selection.

Automatically created groups of strokes may be made instantly available for manipulations and editing. If there is a need to add more strokes within such a spatial group, without conflicting with selectable conditions of the spatial group, the group may be temporarily returned to the wet ink status by moistening. From the standpoint of UI controls, such a moistening operation may be assigned to a multi-touch gesture or to a particular button/menu item on a contextual popup toolbar or a menu that is invoked in response to a multi-touch gesture (for example, tap-and-hold within the fragment). The result of moistening is that the group of strokes becomes a work in progress fragment once again; the group may be visually displayed as wet ink and strokes of the group may temporarily become non-editable, non-selectable, and hence, open to accepting additional strokes, as explained elsewhere herein. After the addition of new strokes has been finished, the original moistened group and the added strokes may dry together and thus create a joined group of strokes for editing and manipulation purpose. Alternatively, new strokes may form several groups as is defined by a time-and-space or other grouping metaphor.

Note that the concept of drying and moistening may differ from a traditional grouping, ungrouping and regrouping paradigm in at least in two significant aspects: (1) the grouping for the system described herein is automatic; and (2) secondary grouping for the system described herein after moistening has a memory about previously created group(s).

In another embodiment of time-and-space based grouping, strokes may be grouped based only on spatial arrangement of the strokes and temporal order but not on lapsed time between the subsequent strokes. In this case, drawing stays in the wet ink format until spacing-based grouping conditions are satisfied. In yet another embodiment, strokes may be grouped spatially but based on the specific user instruction; a user may convey such instruction by performing a designated multi-touch gesture, pressing a dry button present on-screen, or by selecting a menu item, as explained elsewhere herein. Subsequently, all new strokes of wet ink entered after execution of the previous grouping instruction may be grouped into one or more groups based on spatial arrangement of the new strokes and temporal order (but not the timeout). Moistening (ungrouping and locking for editing/manipulations) of any such group of strokes is still available; moistening blocks selection and manipulation operations and allows the addition of handwritten strokes to the group.

In some embodiments, wet and dry strokes co-exist on the screen in such a manner that moistening of grouped strokes may not be required to add the new portions of drawing. In such embodiments, any multi-touch gestures used for selection, manipulation or editing of groups of dry ink strokes or of individual dry ink strokes may be chosen from the set of gestures that cannot be customarily interpreted as drawing gestures—for example, hold gestures. Such gestures may indicate selection and manipulation/editing of dry ink. Thus, in a particular embodiment, a two-finger hold within a dry ink area may select a group of dry ink strokes. Once a group of strokes is selected, wet ink functionality may be disabled, drag gestures may move the group across the screen, pinch and rotate gestures respectively may resize and rotate the group of dry ink strokes, and other manipulations may be performed as necessary. Alternatively, when there is no selection of dry ink strokes, any drawing gesture that the system can process may add wet ink to the screen. For example, a one-finger drag gesture adds a line, while a one-finger tap adds a dot at the tap location; similarly, when a particular multi-touch system is capable of processing multi-finger drawing gestures, the multi-finger gestures may leave traces of wet ink—for example, a two-finger rotate gesture may leave two arcs tracing a trajectory of each finger, i.e. two wet ink strokes.

BRIEF DESCRIPTION OF THE DRAWINGS

Embodiments of the system described herein will now be explained in more detail in accordance with the figures of the drawings, which are briefly explained as follows.

Figure 4A:
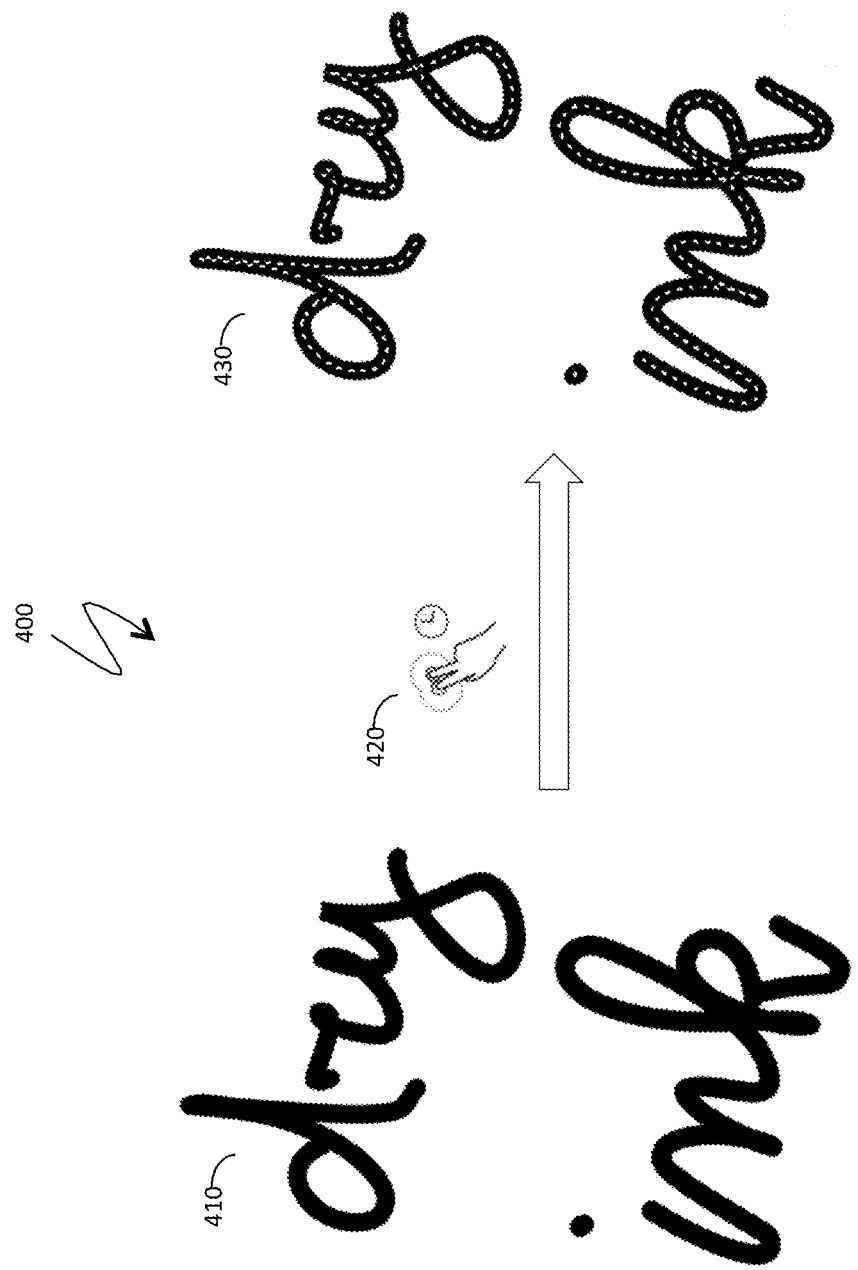
FIGS. 4A-4B illustrate selection and splitting operations for a group of dry ink strokes invoked by multi-touch gestures according to an embodiment of the system described herein.
Figure 4B:
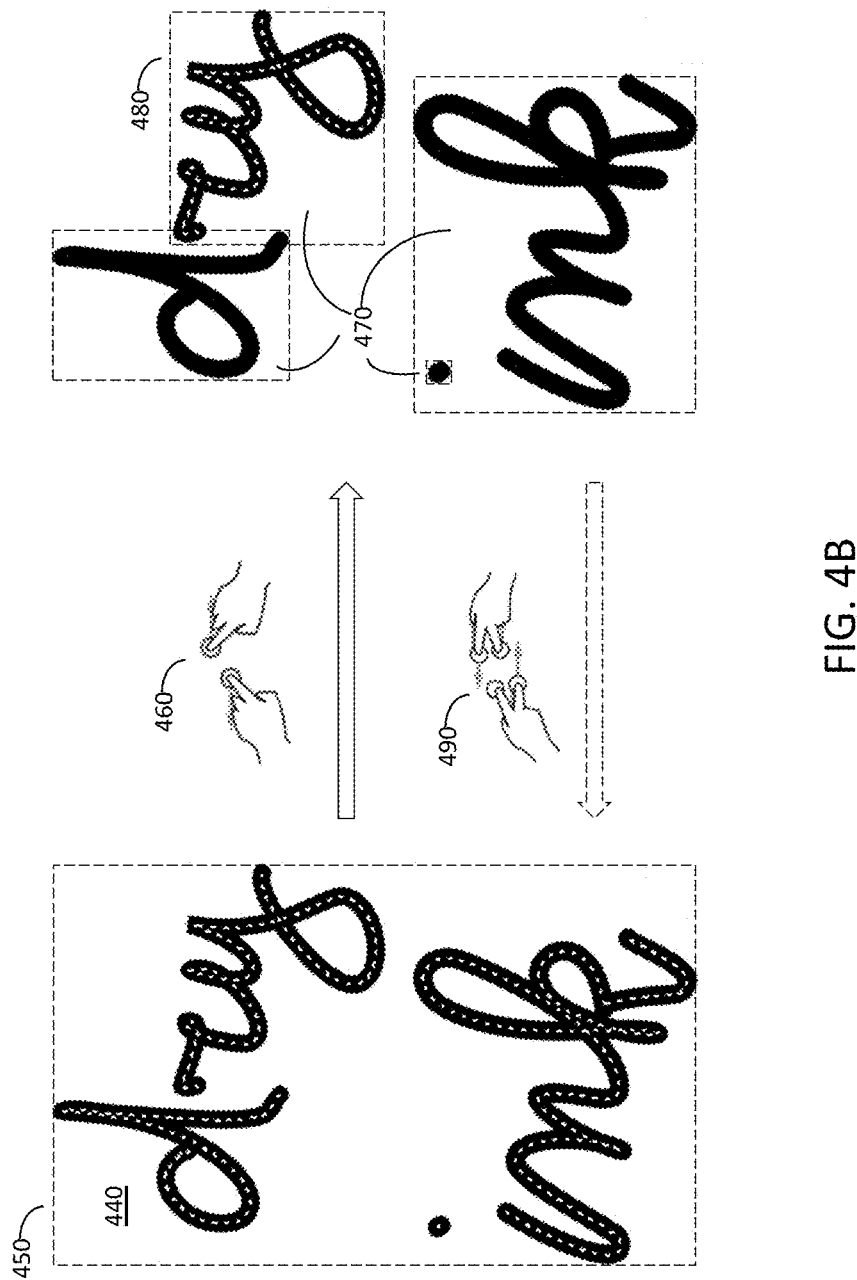
Figure 5:
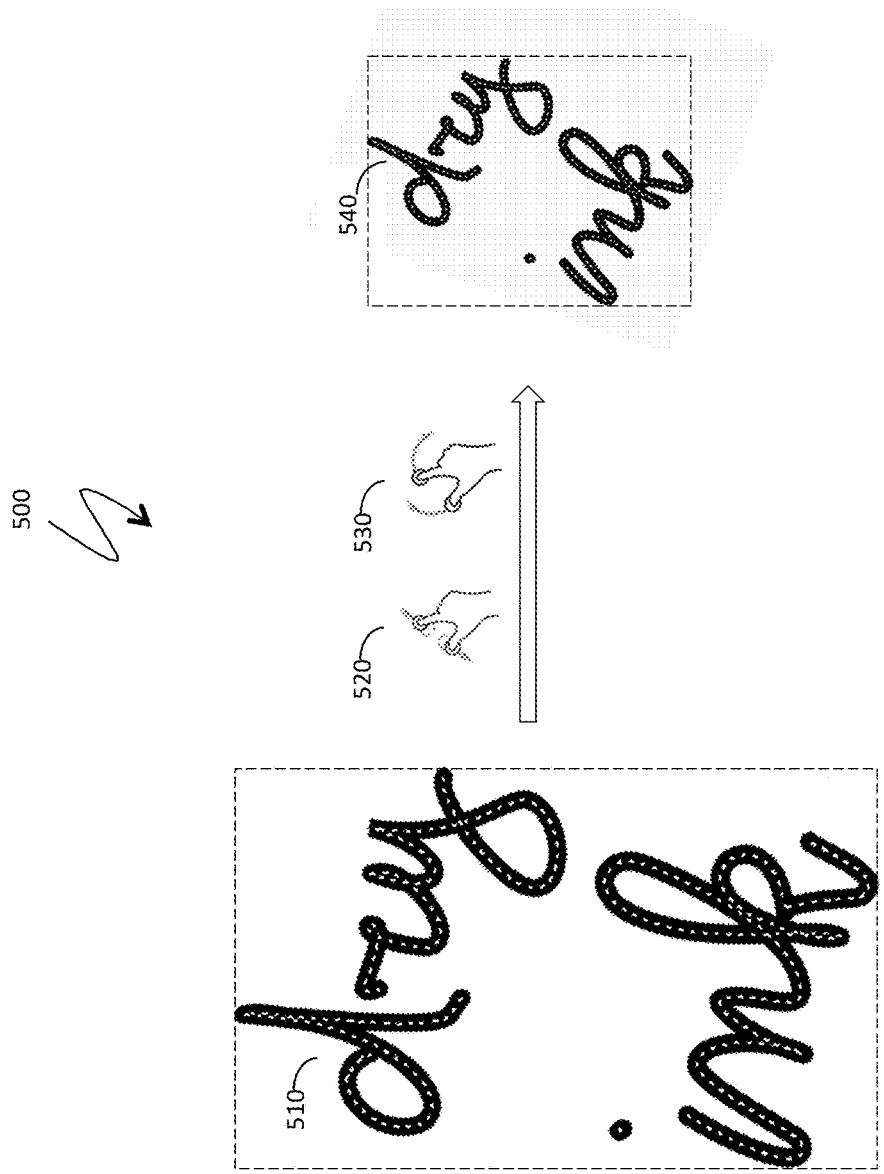
FIG. 5 schematically illustrates selection, manipulations and editing of dry ink strokes via multi-touch gestures according to an embodiment of the system described herein.
Figure 6:
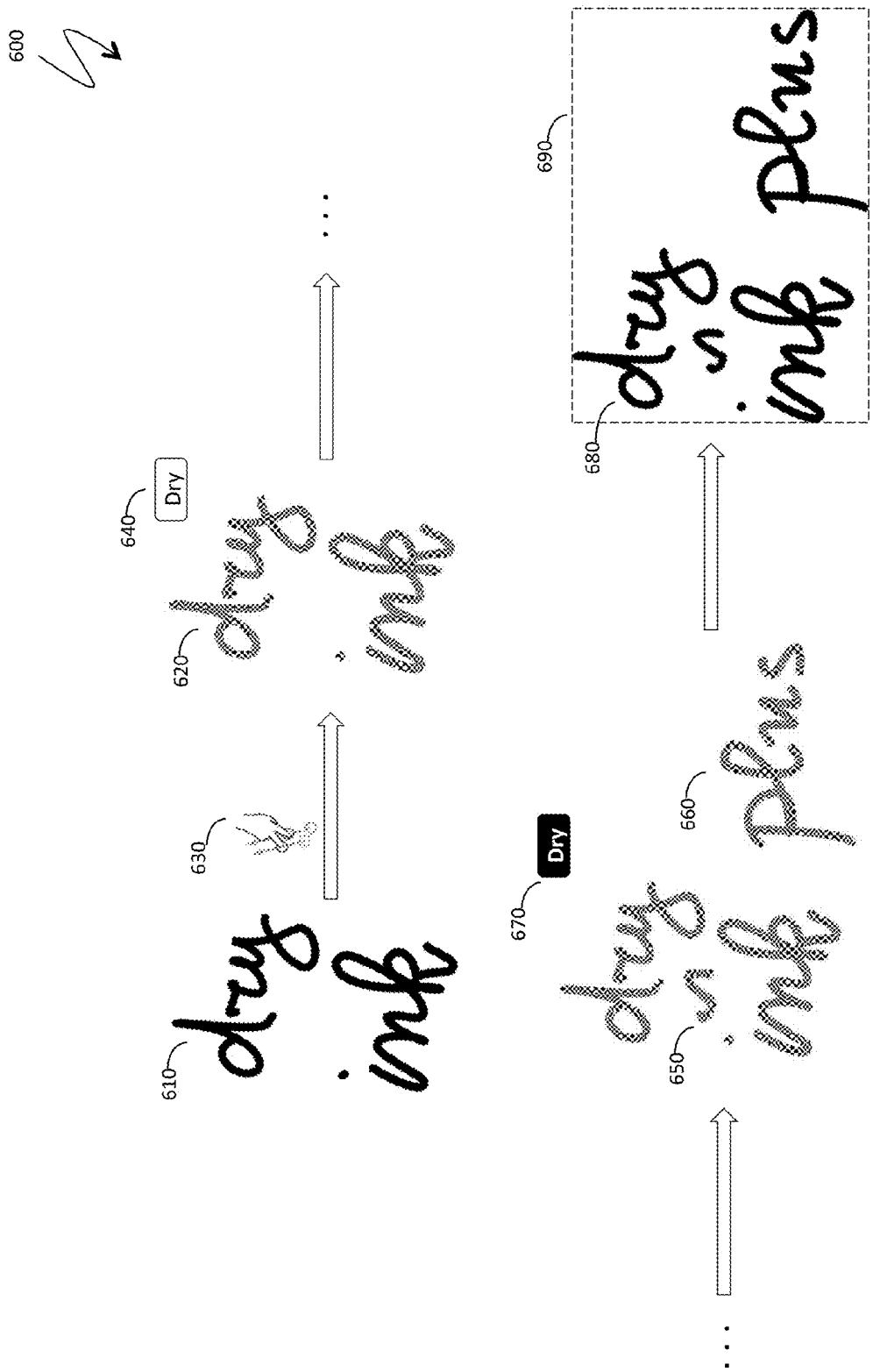
FIG. 6 is a schematic illustration of moistening and re-drying operations according to an embodiment of the system described herein.

Gesture icons on FIGS. 4-6 have been designed by Gestureworks, http://gestureworks.com.

DETAILED DESCRIPTION OF VARIOUS EMBODIMENTS

The system described herein provides an efficient non-conflicting combination of two principal user interface modes for tablets and other multi-touch devices operated by finger and/or stylus: (1) a writing and drawing mode and (2) an object manipulation and editing mode for fragments of handwritten text and drawings. Advancements of existing user interfaces are achieved through automatic time-and-space conditioned grouping or semi-automatic spatial grouping where portions of strokes create natural groups for manipulations and editing. An example is a freehand drawing of a house and a tree near the house that automatically form two groups of strokes, each editable on its own or selectable via multi-selection where a whole picture can be edited. Auto-grouping operation is enhanced with a moistening operation that allows continuation of complex drawings, while retaining an original grouping paradigm. Another operation, splitting of groups of strokes, may reverse automatic grouping and allow individual manipulation and editing of vector objects.

In an embodiment herein, a stroke is a set of all data points collected by the system between the two adjacent Start Writing and Stop Writing events. The Start Writing trigger may correspond to a PenDown (or Touch) event when a digital pen, a finger or other writing instrument contacts the surface of a tablet or other writing surface, or registers in a sufficient proximity to the surface, instructing the system to start collecting and displaying a contiguous fragment of a handwritten trajectory. Similarly, the Stop Writing trigger may correspond to an earliest PenUp (or Up, opposite to the Touch) event when the writing instrument leaves the writing surface (or unregisters from its proximity), thus instructing the system to finish the contiguous fragment of writing initiated by the Start Writing event.

Figure 1:
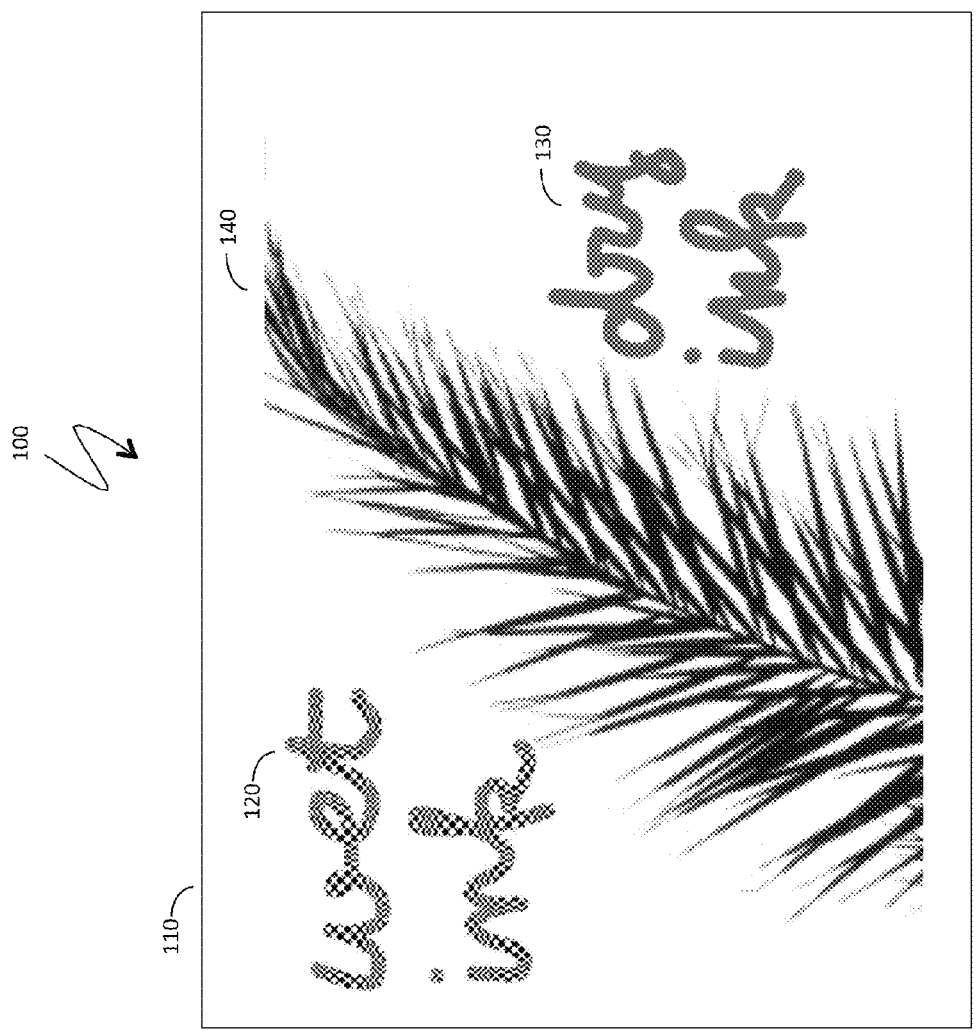
FIG. 1 is a schematic illustration showing wet and dry fragments of handwritten text on a screen with a background image according to an embodiment of the system described herein.

FIG. 1 is a schematic illustration 100 showing wet and dry fragments of handwritten text on a screen with a background image. A drawing on a screen 110 schematically shows a fragment of wet ink 120, which is not editable or selectable. Simultaneously, previously grouped dry ink strokes 130 are present on the screen 110, along with a background image 140. FIG. 1 illustrates an embodiment with an automatic time-and-space based grouping, so that there is no need for a button for periodic grouping of subsequent portions of freehand strokes. Instead, grouping of strokes into dry ink occurs purely based on timing and spatial arrangement of strokes, as explained elsewhere herein.

Figure 2:
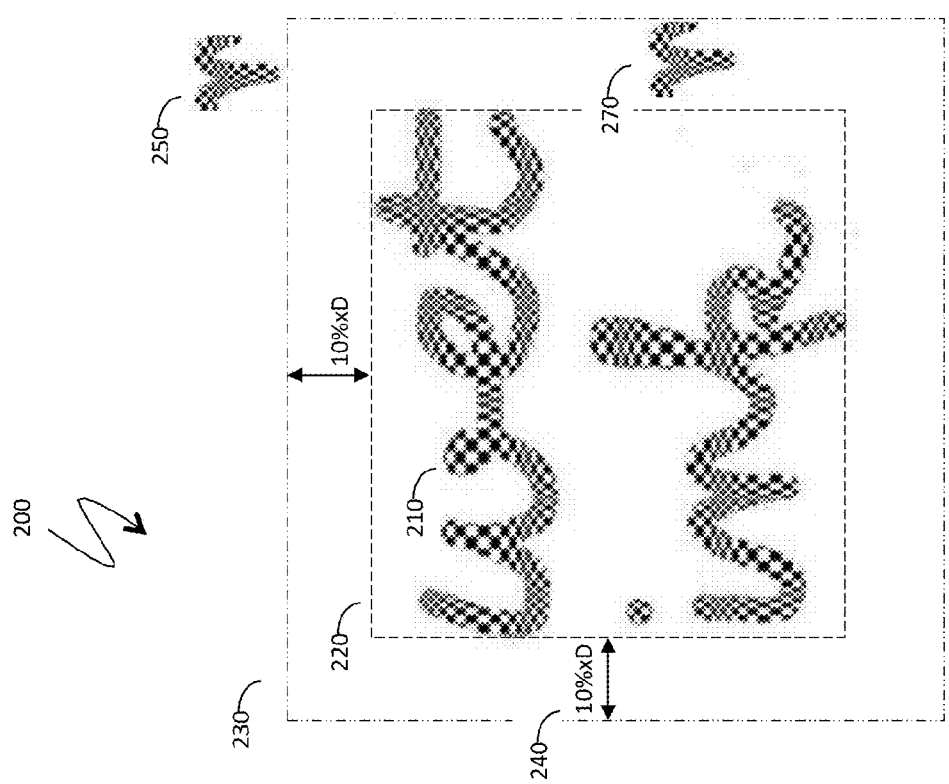
FIG. 2 is a schematic illustration of drying conditions for wet ink with time-and-space conditioned grouping of strokes according to an embodiment of the system described herein.

FIG. 2 is a schematic illustration 200 of drying conditions for wet ink with time-and-space conditioned grouping of strokes according to an embodiment of the system described herein. A current fragment 210 of wet ink is shown in textured strokes. Wet ink may be accompanied by a dynamically calculated bounding box 220—a smallest coordinate rectangle containing all strokes of the fragment. Spatial grouping may also be conditioned by a dynamic outside rectangle 230, which is concentric with the bounding box 220 and with sides that are drawn at a predefined distance from edges of the bounding box 220; in an embodiment, a triggering distance 240 for automatic grouping may be equal to ten percent of a diagonal screen dimension D. Whenever a new wet ink stroke 250 is drawn completely outside of the rectangle 230, all previously drawn strokes 210 may be instantly grouped and drying thereof may be highlighted visually (see, for example, FIG. 1 for a visual difference between the wet and the dry ink). Accordingly, the new stroke 250 may start a new group of wet ink strokes which may produce a separate, new grouping after time-and-space grouping conditions are met (described elsewhere herein). Note that the bounding box 220 and the outside rectangle 230 are shown on FIG. 2 for the illustration purpose only and may be calculated but not displayed on the screen 110, except possibly in connection with debugging a corresponding software application.

There may be a timeout in drawing wet ink strokes that causes instant grouping thereof within a current fragment where the grouping is independent of spatial grouping conditions. In an embodiment illustrated in FIG. 2 and explained elsewhere herein, a timeout limit may be equal to twelve hundred milliseconds. If a next stroke 270 is drawn more than the timeout limit after completing drawing a previous stroke in the fragment 210, then, immediately after the expiration of the timeout, the strokes of the initial fragment 210 may be grouped and converted into the dry ink. In an embodiment illustrated in FIG. 2, the stroke 250 may not be considered.

Figure 3:
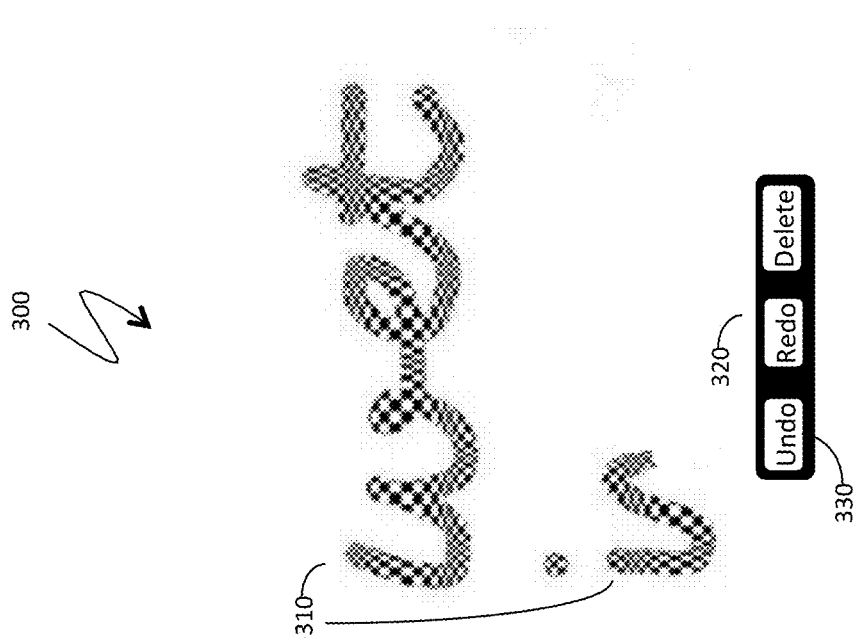
FIG. 3 is a schematic illustration of a popup toolbar accompanying fragments of wet ink according to an embodiment of the system described herein.

FIG. 3 is a schematic illustration 300 of a popup toolbar 320 accompanying fragments of wet ink according to an embodiment of the system described herein. Since finger or stylus based selection and editing of wet ink strokes 310 may be disabled, as explained elsewhere herein, the popup toolbar 320 serves as an enhancement of the wet ink mode. The popup toolbar 230 has buttons 330 that may invoke basic editing operations over the wet ink strokes 310, such as undoing a currently started stroke, redoing a stroke, or deleting a whole fragment of the wet ink. In some embodiments, the presence of the toolbar 320 may be indicated in software settings; in other embodiments, the toolbar 320 may be invoked via a multi-touch gesture or another mechanism before drawing is started.

FIG. 4A is a schematic illustration 400 showing selecting a group of dry ink strokes 410 using a non-drawing two-finger hold gesture 420. After the gesture is processed, a group of dry ink strokes 430 is selected and highlighted by an axial dashed line within the group of strokes 430; additionally, a dashed selection line may be animated. Using a non-thawing stroke for selection of grouped dry ink strokes allows combining the wet and dry ink on the screen, as explained elsewhere herein.

FIG. 4B illustrates a split operation for a selected group of dry ink strokes, invoked by a multi-touch gesture, according to an embodiment of the system described herein. A dry ink fragment 440, enclosed, for illustration purposes, into a bounding box 450, has been selected by a user who has applied a non-drawing multi-touch gesture as explained in more details elsewhere herein in connection with FIG. 4A. A previous selection enables various multi-touch gestures to interact with a selected group of strokes. Thus, when the user makes a splitting gesture 460, strokes comprising the fragment 440 of dry ink may be instantly ungrouped, resulting in multiple individual strokes 470, as illustrated by displaying bounding boxes for each individual stroke; clicking within one of the bounding boxes selects an individual corresponding stroke. For example, it is possible to select the stroke 480, rather than all of the strokes 470. In some embodiments, the system may maintain a record about original groupings of dry ink even after a grouping is split. Accordingly, in such embodiments, a reverse joining gesture 490, exemplified here as a two-finger join gesture, may group the strokes back into an original group, provided that, during individual editing, the strokes of the original group did not lose the spatial proximity sufficient for being regrouped.

FIG. 5 is a schematic illustration 500 that shows selection, manipulations and editing of dry ink strokes via multi-touch gestures according to an embodiment of the system described herein. A group 510 of dry ink strokes may be resized using a two-finger pinching gesture 520. The group 510 may also be rotated using a two-finger gesture 530, resulting in new grouped strokes 540. Note that a same effect may be achieved via tool buttons, rotating wheels and other user interface elements. Note also that operations/manipulations described in connection with FIG. 5 may be applied to portions of one or more split groups, such as the portions 470 described above in connection with FIG. 4B.

FIG. 6 is a schematic illustration 600 of moistening and re-drying operations according to an embodiment of the system described herein. Moistening and re-drying are bridging operations between a writing/drawing mode and a manipulations/editing mode. In different embodiments, re-drying can be performed automatically, based on time-and-space conditioned grouping (described elsewhere herein), or can be done semi-automatically, taking into account only spatial information or drying all wet ink on the screen at once, irrespective of the disposition of wet ink strokes (also described elsewhere herein). FIG. 6 illustrates an embodiment with the semi-automatic grouping based on spatial information for wet ink strokes. According to the system described herein, an original fragment 610 of grouped dry ink strokes may be transformed into wet ink strokes 620 using a moistening gesture 630. Since, in this embodiment, subsequent drying is semi-automatic and requires user action, a dry button 640 may be constantly present on the screen, as long as there exists at least one stroke of the wet ink. In a wet ink mode, clicking for selection may be disabled so that a user may continue writing and drawing anywhere on the screen, including within the bounding box of the current fragment of wet ink, as illustrated by the stroke 650, as well as outside of the box, as exemplified by the stroke 660. Once the user presses the dry button 670, all wet ink may be re-grouped and converted into dry ink 680. In an embodiment in FIG. 6, all wet ink is dried and regrouped according to spatial disposition of wet ink strokes. Specifically FIG. 6 illustrates an embodiment where an assumption is made that a new word, "plus", while written completely outside of the bounding box of the initial wet ink fragment, still satisfies spatial grouping conditions, as explained elsewhere herein (see, for example, FIG. 2 and corresponding text). A whole set of new strokes may be grouped together with original moistened ink, as illustrated by a new bounding box 690.

Figure 7:
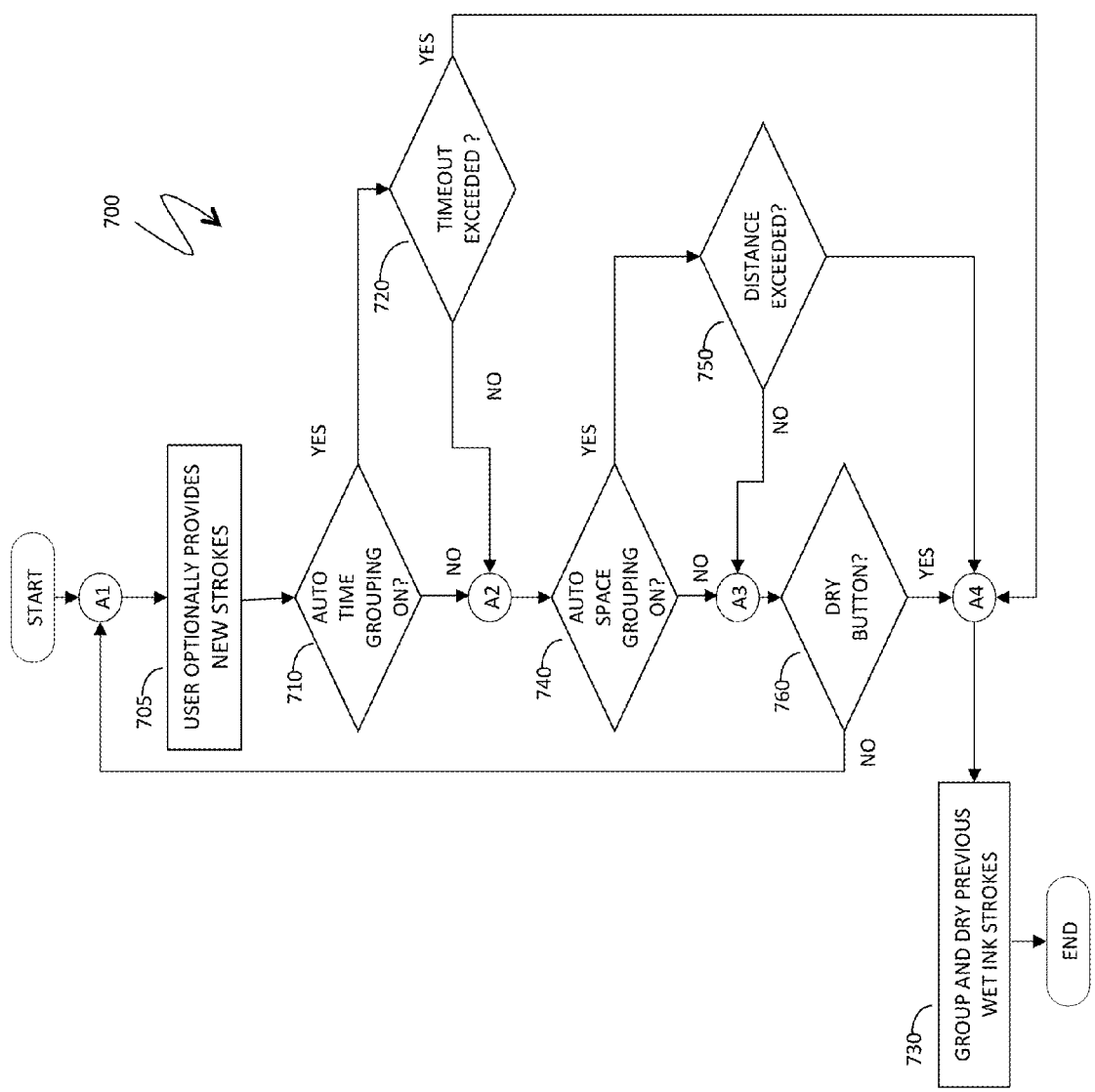
FIG. 7 is a flow diagram showing operations with wet ink according to an embodiment of the system described herein.

FIG. 7 is a flow diagram 700 showing operations with the wet ink according to an embodiment of the system described herein. Processing starts at a first step 705 where the user may provide (draw) new strokes. The new strokes provided by a user are wet until they become dry according to one of the mechanisms described herein. Following the step 705 is a test step 710 where it is determined whether automatic grouping by timeout is enabled. If so, then processing proceeds to a test step 720 where it is determined whether a timeout prior to starting a new stroke has occurred. In an embodiment herein, a timeout occurs when a time delta between the current touch/pen Down event and a preceding touch/pen Up event designating the end of the previous stroke, has exceeded a predefined grouping timeout (such as twelve hundred ms in the embodiment illustrated on FIG. 2). If so, then processing proceeds to a step 730 where wet ink strokes are grouped and displayed on the screen as dry. Processing provided at the step 730 is discussed in more detail elsewhere herein. Following the step 730, processing is complete.

If it is determined at the test step 710 that automatic grouping by timeout is not enabled, or if it is determined at the test step 720 that a timeout has not occurred, then control transfers to a test step 740 where it is determined if automatic grouping by spatial location of wet ink strokes is enabled. If so, then processing proceeds to a test step 750 where it is determined whether a previously drawn stroke—not a stroke that has been just started but a preceding one—has been drawn completely out of a grouping area of a whole previously drawn fragment of the wet ink, i.e. outside an outer rectangle surrounding the bounding box of the previously drawn wet ink strokes, as illustrated by the stroke 250 on FIG. 2. If so, then processing proceeds to the step 730, discussed above, for grouping previous strokes. Following the step 730, processing is complete.

If it is determined at the test step 740 that automatic grouping by spatial location of wet ink strokes is not enabled or it is determined at the test step 750 that a previously drawn stroke has not been drawn completely out of a grouping area of a whole previously drawn fragment of the wet ink, then control transfers to a test step 760 where it is determined whether a user has pressed a dry button (described elsewhere herein) on the screen or has instructed the system to group the wet ink strokes via some other mechanism. Note that the step 760 may also correspond to settings or an embodiment of the system where neither the time-and-space grouping nor spatial grouping of wet ink strokes are available. Under such conditions, a user may have to group fragments of the wet ink manually, by pressing, for example, an on-screen dry button with their finger or a stylus, by performing a designated multi-touch gesture or by some other technique.

If it is determined at the test step 760 that a user has pressed a dry button on the screen or has instructed the system to group the wet ink strokes via some other mechanism, then control transfers to the step 730, described elsewhere herein. Otherwise, control transfers back to the step 705 for another iteration where the user may continue to provide additional new strokes (or not). Note that, at the step 730, wet ink strokes may grouped and drying of the wet strokes may be displayed on the screen. Note also that, in some embodiments, grouping details may depend on a specific path of the flow diagram to the step 730. For example, if the step 730 is reached after a timeout, i.e. the step 730 is reached immediately after the step 720, then all wet ink strokes preceding a current new stroke may be joined together. On the other hand, if the step 730 is reached after the step 750, i.e. after fulfilling a spatial grouping condition, then all strokes preceding the previous (rather than a current stroke) may be grouped together, as explained elsewhere herein. Note also that if the step 730 is reached in response to a user pressing a dry button, then grouping may depend on software/system settings. For example, if the settings require spatial grouping after the explicit user instruction has been given, then the set of accumulated wet ink strokes may form multiple groups of dry ink, following disposition of the ink on the screen. In contrast, if the system/software settings require grouping together all wet ink, then all accumulated wet ink strokes may form a single group of dry ink.

Figure 8:
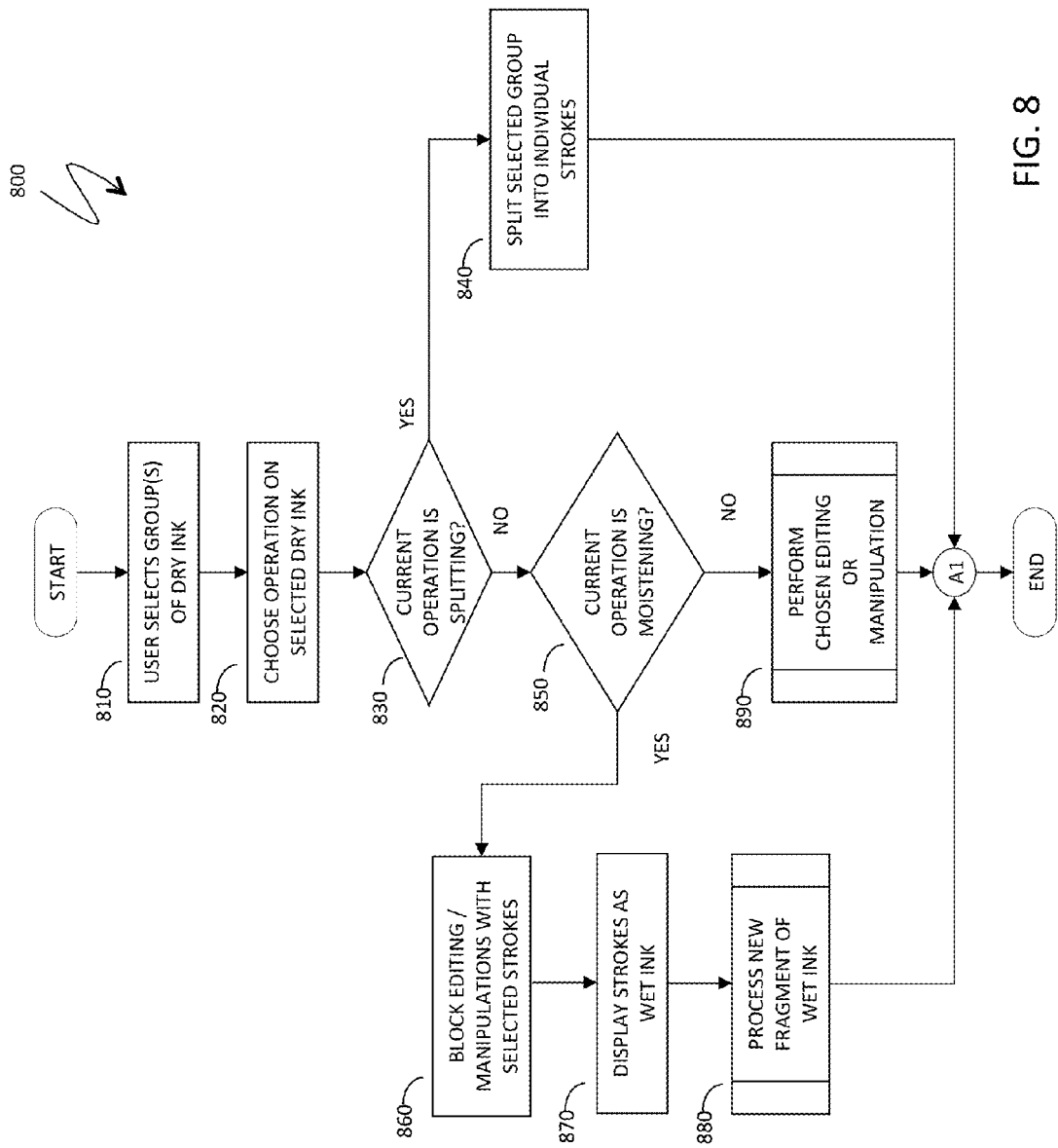
FIG. 8 is a flow diagram showing operations with dry ink according to an embodiment of the system described herein.

FIG. 8 is a flow diagram 800 showing operations with the dry ink according to an embodiment of the system described herein. Processing begins at a step 810 where a user selects a group or multiple groups of dry ink. In an embodiment herein, selecting, manipulating and editing with dry ink strokes is enabled only when there is no wet ink on the screen. In other embodiments, selecting, manipulating and editing with dry ink strokes may always be enabled. After the step 810, processing proceeds to a step 820, where a user chooses an operation to perform over the selected dry ink strokes.

After the step 820, processing proceeds to a test step 830, where it is determined whether the current operation is splitting of the selected group of dry ink strokes. If so, then processing proceeds to a step 840 where all selected groups are split into individual strokes, as explained elsewhere herein (see, for example, FIG. 4 and corresponding text). Specific implementation parameters for splitting may depend on software/system settings. For example, according to one setting, all individual strokes may become unselected, so that manipulation and editing with the resulting individual strokes may require a user to select the strokes again. According to a different setting, strokes may remain selected, so that, for example, the strokes may all be dragged simultaneously to a new screen location, as if the strokes were still a single group, and then the strokes may be unselected and handled individually. Following the step 840, processing is complete.

If it is determined at the test step 830 that a current operation is not splitting, processing proceeds to a test step 850 where it is determined whether the current operation is moistening (described elsewhere herein). If so, then processing proceeds to a step 860 where the system blocks editing and manipulations with selected strokes, as explained elsewhere herein (see FIG. 6 and related detailed descriptions). After the step 860, processing proceeds to a step 870 where the visualization of wet ink strokes is provided using any appropriate mechanism, such as transparency, gloss, texture, animation or other display methods. After the step 870, processing proceeds to a step 880, where the system switches to the wet ink mode and proceeds according to processing described in connection with the flow diagram 700 of FIG. 7. Following the step 880, processing is complete.

If it is determined at the test step 850 that the current operation is not moistening, then control transfers from the step 850 to a step 890. Note that the step 890 is reached if the chosen operation on selected dry ink is neither splitting nor moistening. At the step 890, other operations on the selection may be performed, such as are dragging, cut/copy/deleting, rotating, changing stroke attributes, etc. Following the step 890, processing is complete.

Various embodiments discussed herein may be combined with each other in appropriate combinations in connection with the system described herein. Additionally, in some instances, the order of steps in the flowcharts, flow diagrams and/or described flow processing may be modified, where appropriate. Subsequently, elements and areas of screen described in screen layouts may vary from the illustrations presented herein. Further, various aspects of the system described herein may be implemented using software, hardware, a combination of software and hardware and/or other computer-implemented modules or devices having the described features and performing the described functions.

Software implementations of the system described herein may include executable code that is stored in a computer readable medium and executed by one or more processors. The computer readable medium may be non-transitory and include a computer hard drive, ROM, RAM, flash memory, portable computer storage media such as a CD-ROM, a DVD- ROM, a flash drive, an SD card and/or other drive with, for example, a universal serial bus (USB) interface, and/or any other appropriate tangible or non-transitory computer readable medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method of drawing on a touch screen input of a device, comprising:
   maintaining recently drawn strokes in a wet state after the strokes are drawn on the touch screen input of the device;
   causing strokes in a wet state to transition to a dry state based on at least one of: passage of time, proximity of other recently drawn strokes, and explicit user input directing that at least some wet strokes be transitioned to the dry state;
   grouping strokes in the dry state for future user manipulation based at least in part on how the strokes transitioned from the wet state to the dry state; and
   causing strokes in the dry state to transition back to the wet state, wherein drawing operations do not effect ink in the wet state that was transitioned from the dry state.

2. A method, according to claim 1, wherein proximity of other recent drawing strokes is determined by providing a bounding box that contains initial wet ink strokes and a dynamic outside rectangle outside the first bounding box and wherein the initial wet ink strokes transition from the wet state to the dry state in response to new wet ink strokes being provided outside the dynamic outside rectangle.

3. A method, according to claim 2, wherein a triggering distance between a side of the bounding box and a corresponding side of the dynamic outside rectangle is ten percent of a diagonal size of a screen containing the graphical drawing.

4. A method, according to claim 1, wherein wet ink strokes transition from the wet state to the dry state in response to not adding any new wet ink strokes for a predetermined amount of time.

5. A method, according to claim 4, wherein the predetermined amount of time is twelve hundred milliseconds.

6. A method, according to claim 1, wherein wet ink strokes transition from the wet state to the dry state in response to explicit user input.

7. A method, according to claim 6, wherein the explicit user input includes a user selecting a dry button on a screen containing the graphical drawing.

8. A method, according to claim 1, further comprising:
   splitting a group of dry ink strokes of the graphical drawing into at least two separate portions, wherein each of the portions contains different strokes; and
   manipulating at least one of the at least two of the portions without manipulating other ones of the portions.

9. A method, according to claim 8, further comprising:
   regrouping the at least two separate portions based, at least in part, on a previous grouping of the at least two separate portions.

10. A method, according to claim 8, further comprising:
    using a gesture to split the group of dry ink strokes.

11. A method, according to claim 1, wherein presence of wet ink inhibits selection and manipulation of any portions of the graphical drawing.

12. A non-transitory computer-readable medium containing software that provides a graphical drawing, the software comprising:
    executable code that maintains recently drawn strokes in a wet state after the strokes are drawn;
    executable code that causes strokes in a wet state to transition to a dry state based on at least one of: passage of time, proximity of other recently drawn strokes, and explicit user input directing that at least some wet strokes be transitioned to the dry state;
    executable code that groups strokes in the dry state for future user manipulation based at least in part on how the strokes transitioned from the wet state to the dry state; and
    executable code that causes strokes in the dry state to transition back to the wet state, wherein drawing operations do not effect ink in the wet state that was transitioned from the dry state.

13. The non-transitory computer-readable medium, according to claim 12, wherein proximity of other recent drawing strokes is determined by providing a bounding box that contains initial wet ink strokes and a dynamic outside rectangle outside the first bounding box and wherein the initial wet ink strokes transition from the wet state to the dry state in response to new wet ink strokes being provided outside the dynamic outside rectangle.

14. The non-transitory computer-readable medium, according to claim 13, wherein a triggering distance between a side of the bounding box and a corresponding side of the dynamic outside rectangle is ten percent of a diagonal size of a screen containing the graphical drawing.

15. The non-transitory computer-readable medium, according to claim 12, wherein wet ink strokes transition from the wet state to the dry state in response to not adding any new wet ink strokes for a predetermined amount of time.

16. The non-transitory computer-readable medium, according to claim 15, wherein the predetermined amount of time is twelve hundred milliseconds.

17. The non-transitory computer-readable medium, according to claim 12, wherein wet ink strokes transition from the wet state to the dry state in response to explicit user input.

18. The non-transitory computer-readable medium, according to claim 17, wherein the explicit user input includes a user selecting a dry button on a screen containing the graphical drawing.

19. The non-transitory computer-readable medium, according to claim 12, further comprising:
    executable code that splits a group of dry ink strokes of the graphical drawing into at least two separate portions, wherein each of the portions contains different strokes; and
    executable code that facilitates manipulating at least one of the at least two of the portions without manipulating other ones of the portions.

20. The non-transitory computer-readable medium, according to claim 19, further comprising:
    executable code that regroups the at least two separate portions based, at least in part, on a previous grouping of the at least two separate portions.

21. The non-transitory computer-readable medium, according to claim 19, wherein the executable code that splits a group of dry ink strokes responds to a gesture to split the group of dry ink strokes.

22. The non-transitory computer-readable medium, according to claim 12, wherein presence of wet ink inhibits selection and manipulation of any portions of the graphical drawing.

* * * * *